(12) United States Patent
Bocquet et al.

(10) Patent No.: US 7,168,369 B2
(45) Date of Patent: Jan. 30, 2007

(54) DEVICE FOR MOVING A MACHINE

(75) Inventors: Philippe Bocquet, Pibrac (FR); Brice Miquel, Toulouse (FR)

(73) Assignee: Airbus France S.A.S., Toulouse (FR)

( * ) Notice: Subject to any disclaimer, the term of this patent is extended or adjusted under 35 U.S.C. 154(b) by 0 days.

(21) Appl. No.: 10/792,581

(22) Filed: Mar. 4, 2004

(65) Prior Publication Data
US 2004/0265111 A1    Dec. 30, 2004

(30) Foreign Application Priority Data
Mar. 5, 2003    (FR) .................................. 03 02685

(51) Int. Cl.
*B61J 3/00* (2006.01)
*B60L 1/00* (2006.01)
(52) U.S. Cl. ...................... 104/88.02; 191/2
(58) Field of Classification Search .................. 104/89, 104/90, 91, 96, 1.8, 88.01, 88.02; 414/744, 414/222, 225
See application file for complete search history.

(56) References Cited

U.S. PATENT DOCUMENTS

| | | | |
|---|---|---|---|
| 3,796,327 A * | 3/1974 | Meyer et al. ............ 414/222.2 |
| 4,526,311 A * | 7/1985 | Schroder .................... 228/119 |
| 4,536,690 A | 8/1985 | Belsterling et al. |
| 4,664,590 A * | 5/1987 | Maekawa ................ 414/744.1 |
| 2003/0129045 A1* | 7/2003 | Bonora et al. .............. 414/217 |

FOREIGN PATENT DOCUMENTS

| | | |
|---|---|---|
| DE | 28 38 686 A | 3/1979 |
| FR | 2 688 728 A | 9/1993 |

* cited by examiner

Primary Examiner—S. Joseph Morano
Assistant Examiner—Robert J. McCarry, Jr.
(74) Attorney, Agent, or Firm—Oblon, Spivak, McClelland, Maier & Neustadt, P.C.

(57) ABSTRACT

A device for moving a machine or the like between plural workstations includes: a mechanism for suspending the machine, a guide, a structure for supplying the guide with electrical energy, a mechanical linkage between the machine and the guide, a connector for electrically connecting the machine to the guide, a connector for electrically connecting the machine to each workstation, and a switch for changing the electrical energy supply source of the machine when it is connected to both a workstation and to the guide. Further a management and control device controls moving the machine and its electrical energy supply.

19 Claims, 8 Drawing Sheets

DEVICE FOR MOVING A MACHINE

CROSS-REFERENCE TO RELATED DOCUMENTS

The present patent specification claims priority to French patent application 03 02685 filed Mar. 5, 2003, the entire contents of which are hereby incorporated herein by reference.

BACKGROUND OF THE INVENTION

1. Field of the Invention

The present invention relates to a device for moving a machine or the like between several workstations. One application thereof is in the field of flight simulators, for example.

2. Description of the Background Art

The type of flight simulator to which the present invention is applicable generally includes a cockpit that reproduces a Scale 1 aircraft piloting station and a system for visualizing the outside environment, called a "display," placed opposite the cockpit and including a screen onto which computer-generated synthetic images are projected based on the maneuvers made by users located inside the cockpit. In this case, the machine to be moved is a display and each workstation corresponds to a cockpit.

SUMMARY OF THE INVENTION

The present inventors noted that when several flight simulators are grouped together in a single building, the simulators do not all operate simultaneously. Moreover, some simulation operations do not require a display. The idea behind the present invention is therefore to share a single display between several flight simulator cockpits. Depending upon the number of simulators grouped together in the building, two (or more) displays may be shared between the corresponding cockpits.

Hence, a technical problem to be solved was that of moving a heavy weight, on the order of several tons (103 kg), between several fixed stations, while ensuring electrical energy supply to the moved weight while it is being moved. Preferably, the case of several weights to be moved in succession, corresponding to the sharing of several displays between the cockpits of corresponding simulators, should also be planned for. The same problem may arise in industry if one wishes to move a machine tool between various workstations, such as a machine that must keep a part within certain temperature conditions while it is moved between various machining stations.

One objective of the present invention is therefore to solve this technical problem; that is, to provide a mechanism for moving a heavy weight while supplying it with electricity as it is being moved and guiding it so that it can be placed directly opposite various workstations.

To achieve this, a device for moving a machine or the like between several workstations, includes:

means for placing the machine in suspension, guiding means, means for supplying the guiding means with electrical energy, means for mechanical linkage between the machine and the guiding means, connection means for electrically connecting the machine to the guiding means, connection means for electrically connecting the machine to each workstation, switching means for changing the machine's electrical energy supply source when the machine is connected to both a workstation and to the guiding means, and management and control means for moving the machine and for supplying electrical energy to it.

The device as defined above makes it possible to move the machine while supplying it with electricity. Hence, the moved machine is permanently supplied with electricity (except during any power line disturbances that may occur). Suspending the machine makes it possible to limit considerably the effort required to move the machine and enables very flexible handling not offered by wheel-equipped systems, even when all of the wheels are directional.

In a device for moving a machine or the like according to the invention, the suspension means preferably include air cushions. The number of air cushions is determined by the machine's geometry, by the performance of the air cushions used, and by the weight of the machine to be moved. It should be noted that the air cushions are only used while moving a machine. In light of this fact, these air cushions are advantageously supplied with compressed air via the guiding means.

The guiding means used are preferably aerial guiding means and include, for example, a dolly mounted on a bridge crane. This type of guiding means frees up the ground of the space inside which the machine is moving. In order to obtain the proper precision in moving the dolly in relation to the bridge crane, the latter is advantageously equipped with marks placed on it at regular intervals and the dolly then includes a reader that cooperates with the marks in order to read the dolly's position on the bridge crane. These marks are, for example, barcodes placed over the entire length of the bridge crane. Likewise, for positioning the bridge crane in relation to the building, the bridge crane is, for example, mounted so that it slides along two roughly parallel rails; each rail is preferably equipped with marks placed on it at regular intervals and the bridge crane includes a reader opposite each rail. Each reader cooperates with the corresponding marks in order to read the bridge crane's position in relation to the corresponding rail. Here also, the marks used are barcodes, for example.

When the device for moving a machine or the like according to the invention includes a bridge crane onto which a dolly moves, the bridge crane is advantageously supplied with electrical energy by a system including, on the one hand, a live conductor that extends longitudinally in relation to the movement of the bridge crane and, on the other hand, a contact slipper that is integral to the bridge crane and in permanent contact with the live conductor. This type of system does away with the need to manage a set of electrical cables. This is advantageous, particularly when several machines or the like can be moved between various workstations. In this case, the use of electrical cable sets is preferably avoided because it might result in the sets of electrical cables becoming crossed and mixed together.

To the extent that a bridge crane and its associated dolly are used, it may be anticipated that the connection means for electrically connecting the machine to the aerial guiding means include, on the one hand, a first connector installed on the machine and, on the other hand, a second connector that is to cooperate with the first connector and that is installed on the dolly mounted on the bridge crane; that the first connector is in a fixed position on the machine; and that the second connector is in a mobile position on the dolly between a first position—wherein it is connected to the first connector when both connectors are facing each other—and a second position—wherein it is at a distance from the first connector, the second connector's direction of movement being roughly perpendicular to the junction plane of the two connectors.

The mechanical linkage means include, for example, a vertical linkage bolt and a housing whose shape corresponds to that of the linkage bolt in order to accommodate the latter, with the vertical linkage bolt being advantageously placed on the guiding means and the housing on the machine, or vice versa; and means for performing a relative movement of the linkage bolt in relation to its housing, in a vertical direction, thus enabling the linkage bolt to enter or exit its housing when the linkage bolt is vertically aligned with its housing. In this embodiment, the mechanical linkage means also advantageously include positioning means with, on the one hand, a positioning roller and, on the other hand, a V-shaped housing to accommodate the positioning roller. Here, the positioning roller is integral to the guiding means and the V-shaped housing is integral to the machine, or vice versa. In the latter embodiment variation, the positioning roller is preferably mobile between a raised position and a lowered position, wherein it can cooperate with the V-shaped housing in order to position the guiding means in relation to the machine. The mechanical linkage means moreover preferably include alignment means that include converging guide walls and an alignment roller that moves between the guide walls. The minimal distance between the abovementioned guide walls preferably corresponds to the diameter of the alignment roller. The alignment roller is advantageously integral to the guiding means and the guide walls are advantageously integral to the machine. Preferably, the linkage bolt, the positioning roller in lowered position, and the alignment roller are aligned and at roughly the same height.

In one embodiment of the invention, the connection means for electrically connecting the machine to a workstation include, on the one hand, a first connector installed on the machine and, on the other hand, a second fixed connector that is to cooperate with the first connector and that is installed on a vertical wall of the workstation. In this case, the first connector is, for example, mobile on the machine between a first advanced position, wherein it is connected to the second connector when the two connectors are opposite each other, and a second withdrawn position, wherein it is at a distance from the second connector, with the first connector's movement direction being roughly horizontal and perpendicular to the junction plane of the two connectors.

In one advantageous embodiment of the invention, the switching means that are able to change the machine's electrical energy supply source when the machine is electrically connected both to a workstation and to the guide means include comparison means in order to verify, prior to switching, that the line connection of the electrical current phases of the future supply source corresponds to the line connection of the electrical current phases of the present supply. The tests performed by these comparison means must make it possible to prevent the machine from being damaged if, for example, an intervention is made on the electrical network and the electrical wires are switched inadvertently.

For proper positioning of the machine by the device of the invention, each workstation is advantageously equipped with two stops that cooperate with counterstops installed on the machine, and in order to guarantee that the machine remains immobile, it preferably includes securing means for securing it onto at least one of the stops.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
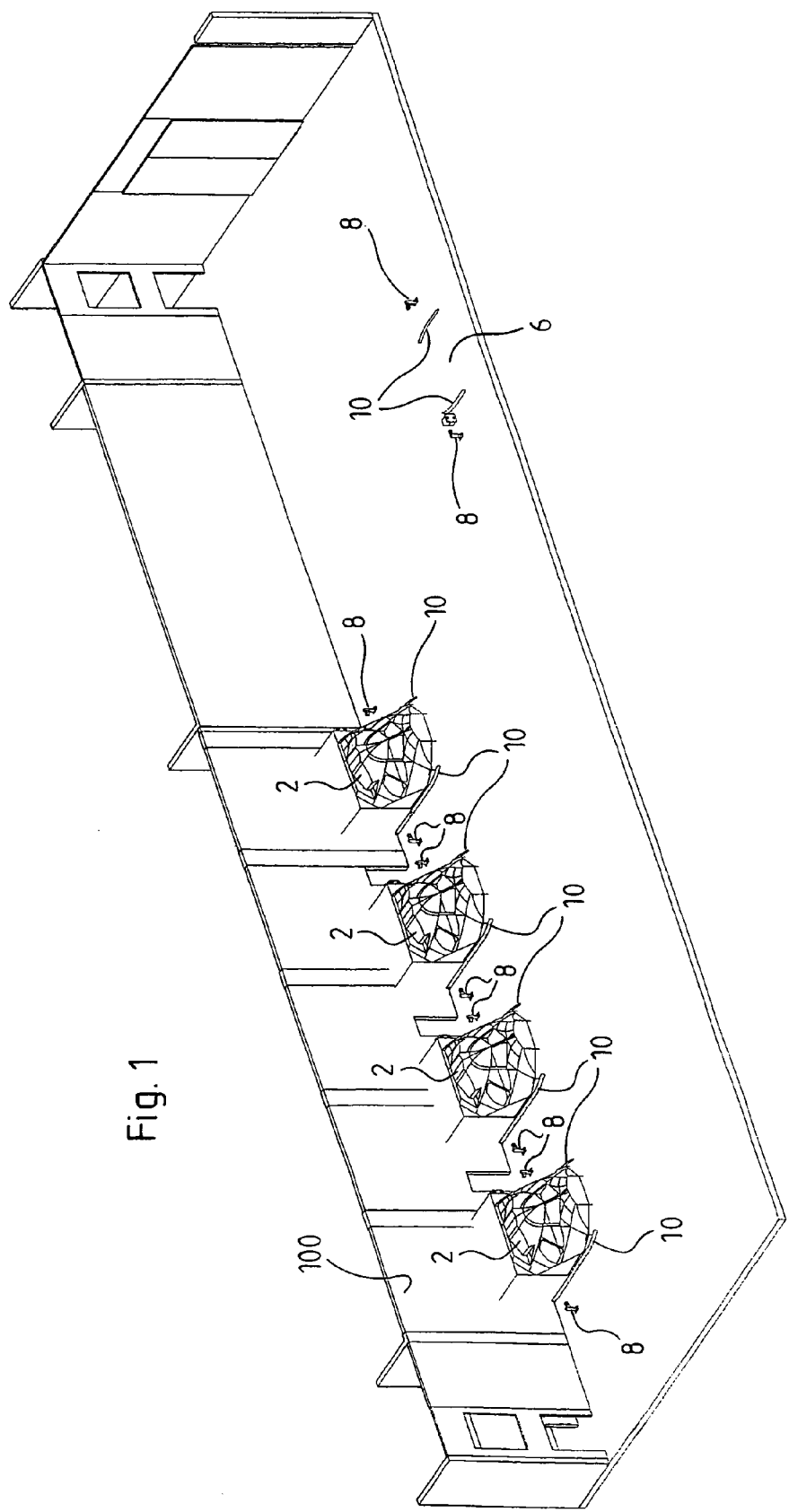
FIG. 1 shows the inside of a building intended to accommodate a device according to the invention.

FIG. 1 shows the inside of a building inside which four aircraft cockpits 2 are arranged. Each of these cockpits 2 is part of a flight simulator. The other part of these flight simulators is composed of a system for visualizing the outside environment, referred to hereinafter as a display 4 and shown in FIG. 4. This display 4 is mobile and can be moved so that it faces each aircraft cockpit 2. Therefore, the room shown has four flight simulators, all of which share a single display 4. A maintenance area 6 for the display 4 is also planned for the building shown.

The device of the invention allows the display 4 to be moved inside the room so that can be positioned either facing a cockpit 2 or brought to its maintenance area 6. This display 4's movement takes place on a ground surface that is assumed to be horizontal in the remainder of the description. Note, at the level of each aircraft cockpit 2 and on the maintenance area 6, the presence of stops 8 and guide rails 10. This equipment enables accurate positioning of the display 4 in relation to the cockpits 2 and on the maintenance area 6. One method of performing this positioning is described in greater detail further on in the present description.

Figure 2:
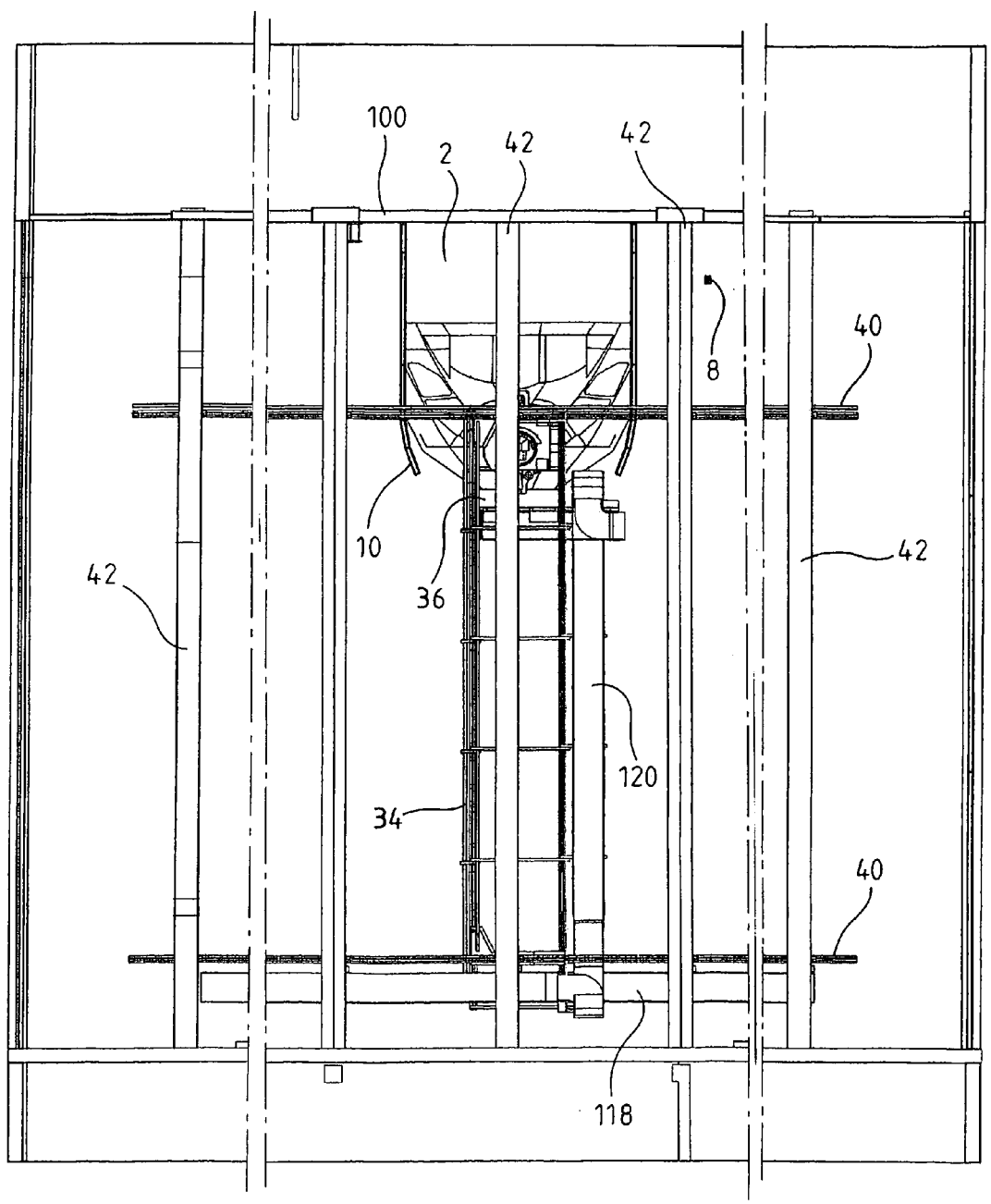
FIG. 2 shows the same building in top view and equipped with a bridge crane.
Figure 4:
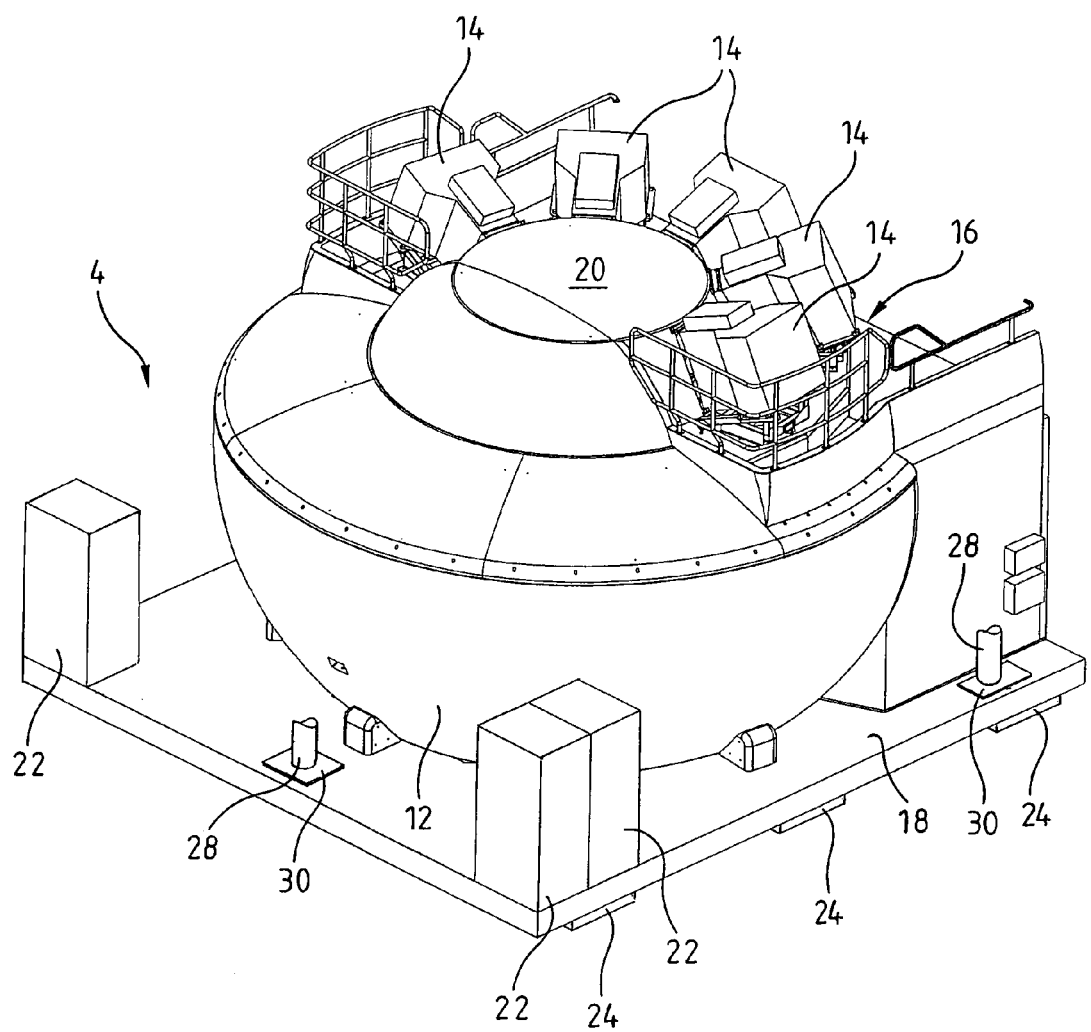
FIG. 4 shows a flight simulator display.

FIG. 4 shows in perspective view the display 4 that moves inside the building shown in FIGS. 1 and 2. This display 4 includes in particular a mirror (not shown) attached to an outer wall 12 and projectors 14 for projecting an image onto a screen (not shown). It takes the form of a room that is roughly hemicylindrical and includes an opening 16 at the rear, mounted onto a platform 18 and on the ceiling 20 of which the projectors 14 are mounted. This room sits atop an aircraft cockpit 2 such that a person sitting inside this cockpit 2 in the pilot or copilot's seat only sees the mirror of the display 4 through the windows of this cockpit 2. This mirror is oriented towards the screen of the display 4 and the projectors 14 are oriented towards this screen. Therefore, persons sitting inside the cockpit 2 see the image projected by the projectors 14. The mirror takes the form of a sphere portion extending horizontally over approximately 200° and over a sufficient height, on the order of 1.50 m, for covering the entire field of vision of a pilot or copilot sitting at his/her position inside the cockpit 2, looking through the windows of the cockpit 2. Calculators 22 mounted on the platform 18 manage the projectors 14 and generate the projected image so that the latter corresponds to the received piloting instructions and so that the image seen by the pilot and copilot accurately reproduces what they would see if they were onboard an aircraft. This type of display 4 is known and is not described in further detail here.

Figure 3:
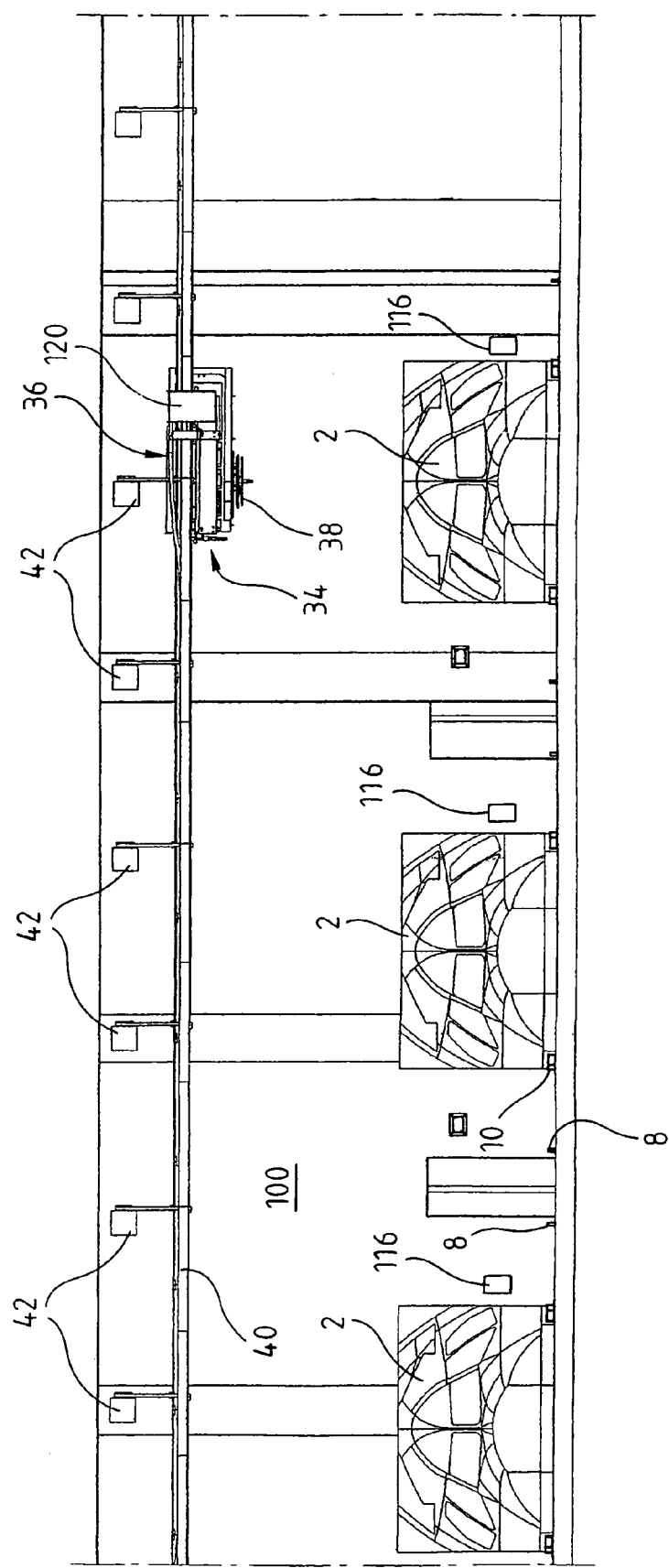
FIG. 3 is a side view of the bridge crane of FIG. 2.

The display 4 in FIG. 4, as compared to a known display of the prior art, is mounted on air cushions. Six air cushions 24 are distributed at regular intervals under the platform 18 near the latter's edge. All types of air cushions may be used here. Each of the air cushions 24 shown includes a plate that is attached under the platform 18. A membrane is attached to the edge of the underside of this plate and to its center. A peripheral chamber is thus created under the plate. This chamber is supplied with compressed air. Calibrated holes made in the membrane near the latter's central attachment allow the air to escape from the chamber at a known rate. The air that escapes under the plate, at its center, forms the air cushion, which is limited in space by the inflated membrane and by the ground, on which the platform 18 rests without making contact with the ground. When the six air cushions 24 are supplied with compressed air, the platform 18 and the entire display 4 are then suspended above the ground of the building shown in FIGS. 1 through 3.

Figure 5:
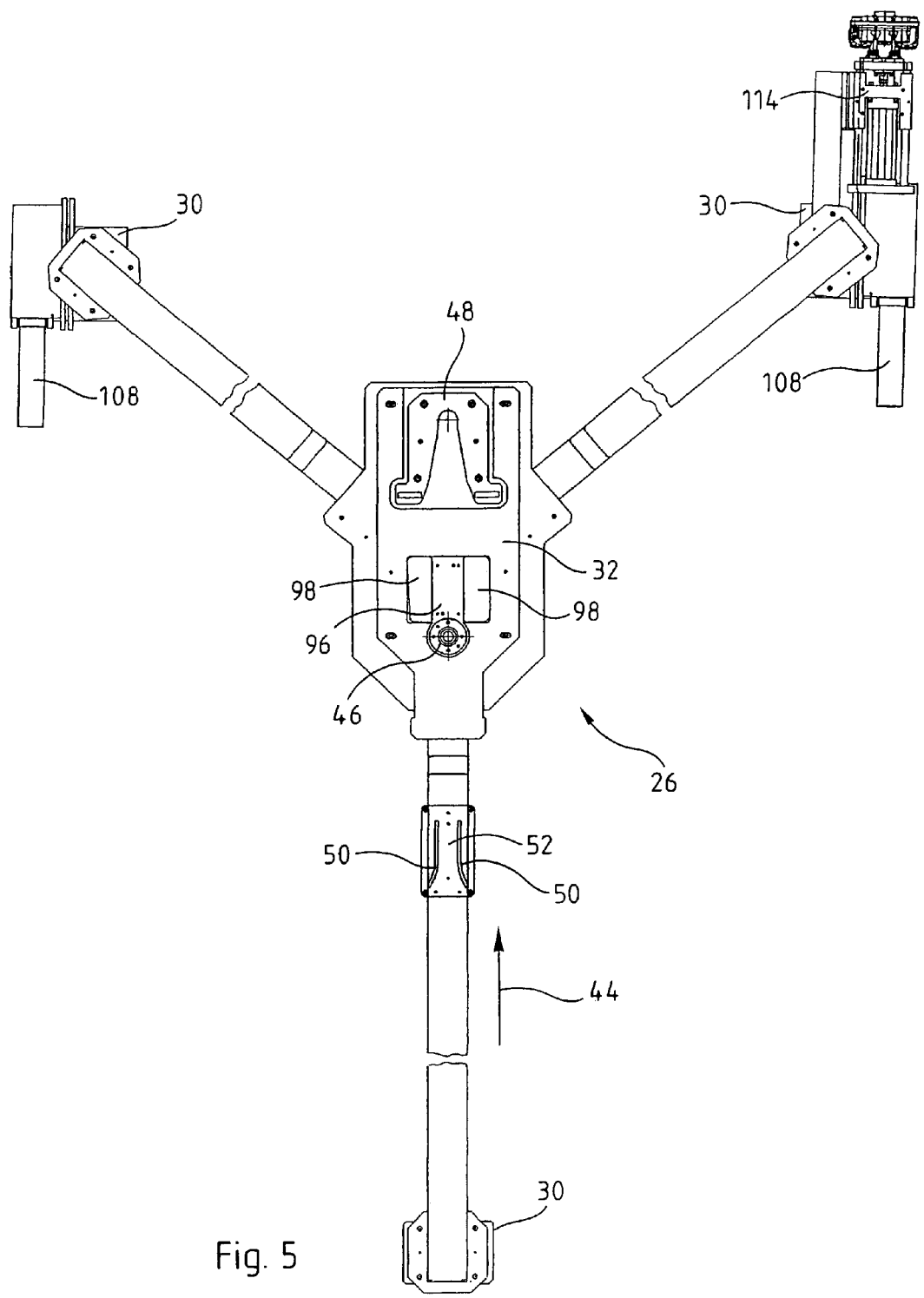
FIG. 5 shows in top view a tripod that cooperates with the display in FIG. 4.
Figure 6:
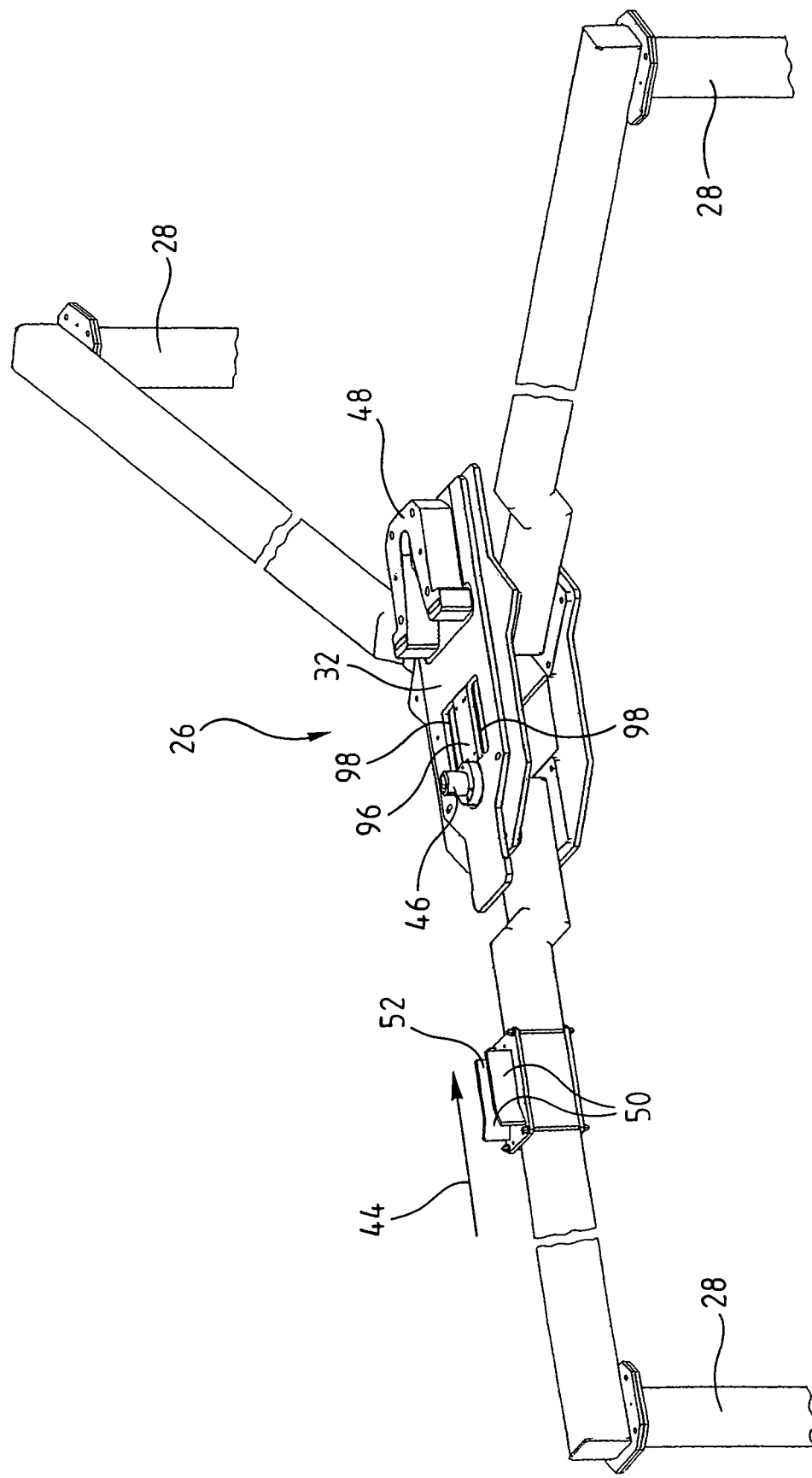
FIG. 6 is a perspective view of the upper part of the tripod in FIG. 5.

The display 4 is moreover equipped with a tripod 26, shown in top view in FIG. 5 and partially in perspective view in FIG. 6. As its name indicates, this tripod 26 is equipped with three feet 28. Each of these feet is equipped with a sole 30, in the form of a metal plate, which enables the tripod 26 to be attached onto the upper face of the platform 18 of the display 4. The three feet 28 meet above the ceiling 20 of the display 4. At the junction of the three feet 28 is found a first interface device 32. The tripod 26 forms a gate above the display 4. The first interface device 32 enables linkage of the display 4 to the guiding and moving means described below.

FIG. 2 shows, in top view, a bridge crane 34 used to move and guide the display 4. FIG. 2 is partially cut away and shows only the area of the building where the bridge crane 34 and the ends of the building are located. The bridge crane 34 is equipped with a dolly 36. This dolly moves in a horizontal plane parallel to the ground of the building and is installed a few meters above it. A second interface device 38 is mounted on the dolly 36 (cf. FIG. 7). This second interface device 38 cooperates with the first interface device 32 to perform mechanical, electrical, and pneumatic coupling between the dolly 36 and the display 4.

The bridge crane 34 is suspended on two parallel rails 40 that run along the entire length of the building. These rails 40 are horizontal and suspended on the beams 42 of the building accommodating the bridge crane 34. For the bridge crane 34 to move while remaining perpendicular to the rails 40, each end of the bridge crane 34 is equipped with a system for driving the bridge crane 34 in relation to the corresponding rail. Additionally, in order to know precisely the position of the bridge crane 34 in relation to the rails 40 (which are fixed in place) and therefore in relation to the building, each rail 40 is equipped along its entire length, corresponding to the path along which the bridge crane 34 travels, with a barcode strip. A barcode reading system is mounted opposite this strip on each end of the bridge crane 34. In this way, one may know the exact position of the bridge crane 34 and determine whether the bridge crane 34 is perfectly perpendicular to the rails 40. Automatic control of the bridge crane's driving devices by barcode readers guarantees undistorted movement of the bridge crane.

The dolly 36 of the bridge crane 34 moves on the latter perpendicular to the rails 40. Here again, in order to fully control the dolly's 36 position in relation to the bridge crane, the dolly is equipped with a barcode reader and a barcode strip is attached onto the bridge crane 34 such that it is located opposite the corresponding reader along the entire travel path of the dolly 36 on the bridge crane 34. The system for driving the dolly 36 on the bridge crane 34 is a traditional drive system of the prior art, as is the system for driving the bridge crane 34 in relation to the rails 40, and is therefore not described in further detail here.

The first (32) and second (38) interface devices enable mechanical, electrical, and pneumatic linkage between the display 4 and the dolly 36 of the bridge crane 34. Mechanical linkage is carried out first. Once the dolly 36 and the display 4 are mechanically integrated, the electrical and pneumatic connections are made.

Operations for mechanical and other types of coupling are always performed when the display 4 is opposite a cockpit 2 or is on its maintenance area 6. When the system is required to manage several displays, another possibility is to provide parking spaces for the display(s) not in use. These operations therefore always take place at precise predetermined locations. The display 4 is then immobile and the bridge crane 34 and its dolly 36 move in order to find the display 4. The bridge crane 34 positions itself first at the height of the display 4, then the dolly 36 moves to a position just above the display 4 and its first interface device 32.

In order to ensure proper guidance and positioning of the two interface devices 32 and 38, the dolly 36 always arrives in the same direction in relation to the display 4. This direction is shown by an arrow 44 in FIGS. 5 through 7 and is perpendicular to the rails 40 of the bridge crane 34. Guiding and centering means described below then enable accurate positioning of the two interface devices in relation to each other. Once the positioning is completed, mechanical coupling is performed, followed by electrical and pneumatic coupling.

The first interface device 32 (FIGS. 5 and 6) is installed on the tripod 26. It includes, first of all, a cylindrical sleeve 46 that is oriented so that its axis of revolution is vertical. This sleeve 46 is also installed such that it is located roughly above the center of gravity of the mobile assembly including the display 4, its platform 18, and its tripod 26.

The first interface device 32 also includes, at roughly the same altitude as the sleeve 46, centering and alignment means. First, there is a V-shaped part 48. This part has a plane of symmetry aligned along the direction indicated by the arrow 44 and the opening of the V is oriented towards the sleeve 46. On the other side of the sleeve 46, aligned with this sleeve 46 and the V-shaped part 48, is located an alignment assembly formed of two vertical alignment walls 50. These two alignment walls 50 mark off a horizontal channel 52 that runs in the direction indicated by the arrow 44. The entrance to this channel—that is, its end distant from the sleeve 46—is flared to enable guiding towards the interior of the channel 52.

The second interface device 38 (FIG. 7) includes means in addition to those of the first interface device 32 described above. First of all, it has a bolt 54 shaped like a circular cylindrical bar that fits inside the sleeve 46. The axis of this bolt is vertically arranged and a jack 56 is provided in order to move this bolt 54 vertically from a raised unbolted position to a lowered bolted position. In its bolted position, the lower end of the bolt 54 is located inside the sleeve 46. The upper opening of the sleeve is preferably flared in order to make it easier to insert the bolt 54 into the sleeve 46.

Additionally, the outer diameter of the bolt 54 and the inner diameter of the sleeve 46 are adapted such that there is limited play between these two parts while allowing them to slide over/under each other effortlessly.

The second interface device 38 also has two guiding and alignment rollers. A first roller 58 cooperates with the V-shaped part 48. The diameter of this first roller 58 corresponds to a rounded shape at the point of the V of the V-shaped part 48. The second roller 60 cooperates with the alignment walls 50. It is aligned with the bolt 54 and the first roller 58. Its diameter corresponds roughly to the width of the channel 52 in its non-flared section. When the first roller 58 is positioned at the bottom of the V of the V-shaped part 48 and the second roller 60 is positioned inside the channel 52 between the alignment walls 50, the bolt 54 is located just above the sleeve 46.

In order to prevent a collision between the first roller 58 and the sleeve 46, the first roller 58 is mounted at the end of an arm 62 that is mounted so that it can pivot around a horizontal pivoting axis 64, between a position where the arm 62 is roughly vertical and the first roller 58 is in a lowered position and a second position where the arm 62 is roughly horizontal and the first roller 58 is in a raised position. A jack 66 is provided for controlling the pivoting of the arm 62 and the lowering (or raising) of the associated first roller 58.

It is also advisable to be able to catch positioning errors of the bridge crane 34 and the dolly 36 when the dolly 36 comes to "look for" the display 4. To do this, the second interface device 38 is equipped with crossed tables. This makes it possible to have two degrees of freedom in translation in a horizontal plane for positioning the dolly 36 during guiding and alignment maneuvers prior to coupling using the bolt 54 and the rollers 58 and 60 of the display 4 with the dolly 36. A third degree of freedom, in rotation around a vertical axis, for enabling perfect alignment between the first (32) and second (38) interface devices is also provided.

Figure 7:
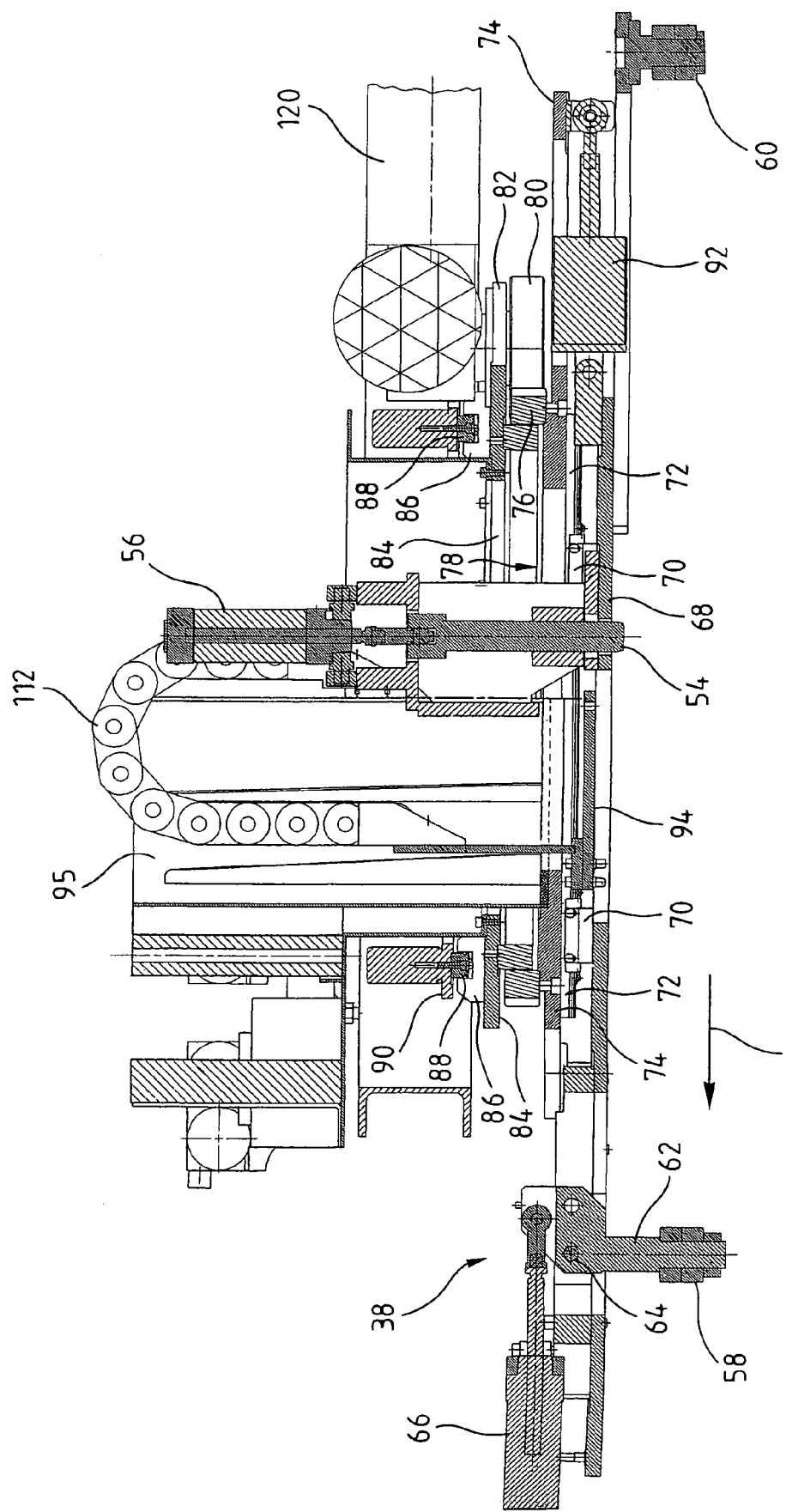
FIG. 7 is a cross-section view of an interface device between the bridge crane in FIGS. 2 and 3 and the tripod in FIGS. 5 and 6.

The bolt 54 and the rollers 58 and 60 are mounted onto a horizontal lower table 68. The bolt 54 is attached onto the upper face of this lower table but a passage is provided in this lower table 68 for this bolt 54, such that its end that performs the bolting with the first interface device 32 is located underneath the lower table 68. The upper face of the lower table 68 also has guide shoes 70 equipped with balls or the like. These shoes accommodate corresponding guide rails 72 that are mounted onto a first intermediary table 74. The latter has, on its upper face, a ring gear 76. The inner face of this ring gear 76 is smooth and is guided, optionally by bearings, onto a guide ring 78. The toothed outer surface of the ring gear 76 meshes with a sprocket wheel 80, placed in a horizontal plane, as is the ring gear. This sprocket wheel 80 is driven by an engine 82 and can control the rotation of the ring gear 76. The engine 82 and the guide ring 78 are both attached onto a second intermediary table 84. The latter has, on its upper face, other guide shoes 86 that cooperate with other guide rails 88, which are attached on to an upper table 90. The latter is integral to the dolly 36 that slides on the bridge crane 34. In FIG. 7, it should be noted that the guide rails 88 are mounted perpendicular to the guide rails 72. This perpendicular arrangement makes it possible to have crossed tables.

When the dolly 36 drives the display 4, outside of the area marked off by the guide rails on the ground, it is advisable to block the three degrees of freedom left by the second interface device 38. To do this, blocking means are used. The engine 82 can block free rotation of the ring gear 76 around the guide ring 78. With regard to the degrees of freedom in translation, jacks are used. A first blocking jack 92 is mounted between the lower table 68 and the first intermediary table 74 in order to prevent any involuntary translation between these two tables. A second blocking jack (not visible in FIG. 7) makes it possible, in the same way as the first blocking jack 92, to block any translation between the upper table 90 and the second intermediary table 84.

When mechanical coupling is performed between the dolly 36 and the display 4, the electrical and pneumatic connections can be made. A plate 94 carrying all of the electrical outlets and a pneumatic outlet is mounted onto the lower table 68 of the second interface device 38. This plate 94, located in a horizontal plane, can be moved vertically thanks to a connection jack 95 enabling its movement from a connected lower position to a disconnected upper position.

The first interface device 32 includes a counterplate carrying the electrical and pneumatic plugs corresponding to the outlets of the plate 94. This counterplate of the first interface device 32 is not shown in the drawing. However, in FIGS. 5 and 6, the housing 96 inside which this counterplate and the plugs it carries are placed can be seen. Attachment surfaces 98 for this counterplate are provided and are shown in the drawing.

The display 4, when it is located opposite a cockpit 2, is secured to the ground of the building and is electrically connected for its electrical energy supply but also to exchange signals and information with the cockpit 2. To do this, mechanical and electrical linkage means are also provided. There is no point in having a pneumatic linkage in this rest position since the air cushions 24 are used only when the display 4 is being moved.

Figure 8:
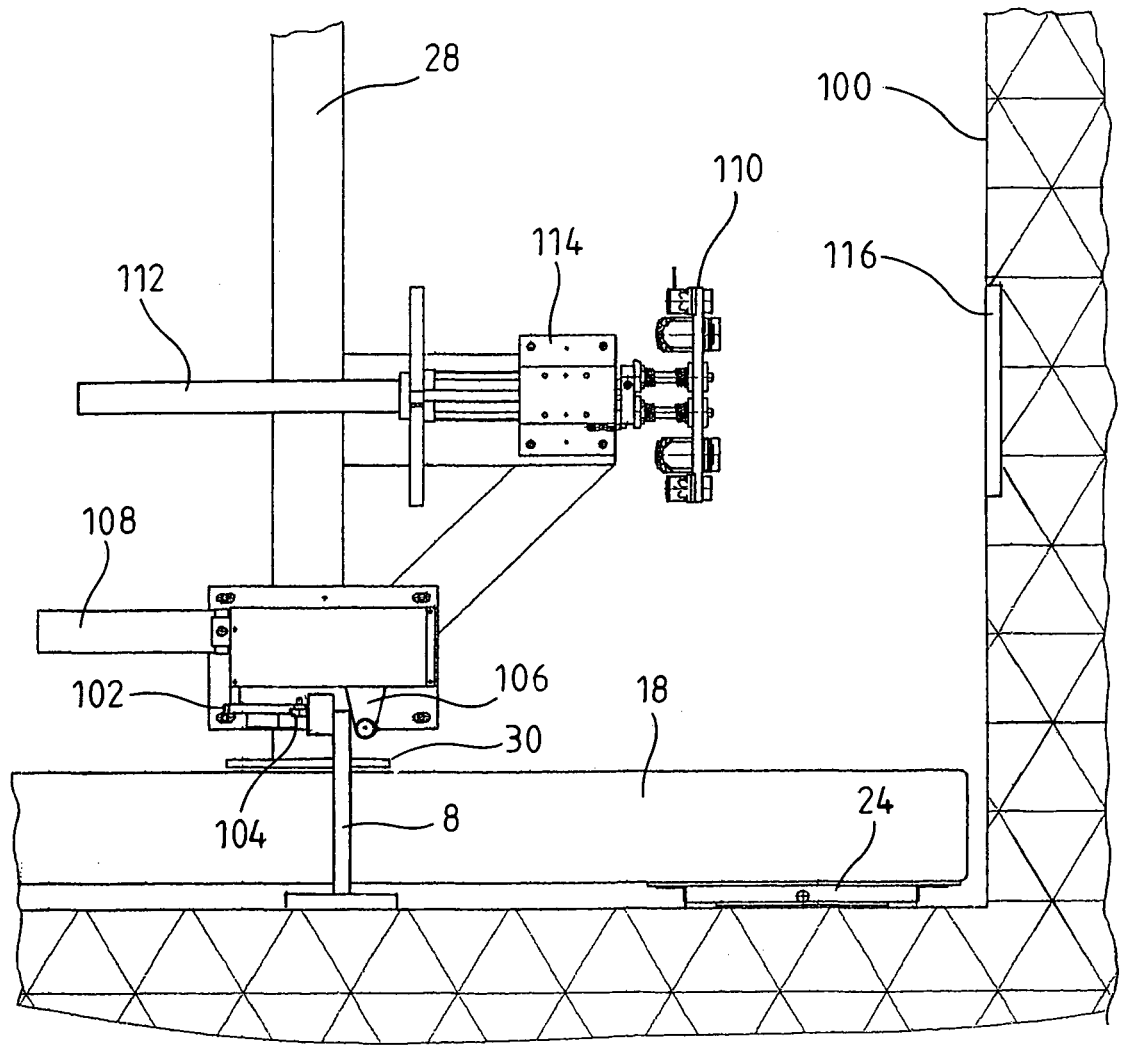
FIG. 8 is a detailed elevation view of the means for electrically connecting a display to a fixed station.

FIG. 8 illustrates the securing of a display 4 opposite a cockpit 2. In this figure, one sees the platform 18 of the display 4, an air cushion 24, and a foot 28 of the tripod 26. The elements mounted on this foot 28 and shown in elevation view in this FIG. 8 are shown in top view in FIG. 5. These elements include, on the one hand, means for mechanical securing of the display 4 on the stops 8 and, on the other hand, means for making the electrical connection of the display 4.

When the display 4 is led by the dolly 36 towards the cockpit 2, opposite which it is placed, the platform 18 is guided at the end of its travel path by the guide rails 10 to its final position, where the display 4 is operational opposite the cockpit 2. The end of the display's travel path 4 is roughly perpendicular to the wall 100 of the building on which the cockpit 2 is located. During this final approach phase, when the platform 18 is guided by the guide rails 10 on the ground, the three degrees of freedom at the level of the second interface device 38 are again made available by unblocking of the corresponding jacks and engine. At the end of its travel path, the display 4 comes to a stop against the stops 8 attached to the ground of the building. A horizontal finger 102, at whose free end is mounted a travel path end sensor 104, comes up against the stop 8. This stop 8 can be a flat stop piece. However, in order to perfectly center the display 4 opposite the cockpit 2, there may be two convergent surfaces on the stop 8, in a dihedral shape for example, with the seam of the two convergent planes being a vertical straight line. In this way, the finger 102 is centered on this vertical line. Preferably, a stop 8 is provided on each side of a cockpit 2 but only one of these stops centers the display 4 in relation to the cockpit 2.

Once the two fingers 102 of the display are up against the corresponding stops 8, the display 4 is secured onto these stops. FIG. 8 shows the display 4 in secured position. In this position, the stop 8 is sandwiched between a securing arm 106 and the finger 102. When the display 4 is moved, the securing arm 106 is in a roughly horizontal raised position so that it does not bump up against the stop 8. Once the display 4 is properly positioned opposite the cockpit 2, a securing jack 108 acts upon the arm and causes it to pivot, such that it sandwiches the stop 8 with the finger 102. The kinematics of the securing arm's 106 movement corresponds roughly to that of the pivoting arm's 62 movement.

The electrical connection of the display 4 to the cockpit 2 is also illustrated in FIG. 8. A mobile plug 110 in a vertical plane is mounted onto a foot 28 of the tripod 26 such that it is located opposite the wall 100 when the display 4 is in place opposite a cockpit 2. This mobile plug 110 is driven by a hydraulic jack 112. The entire assembly is mounted onto a support 114 that also ensures guiding of the plug 110 while it is moving from a disconnected retracted position to an advanced position where it is connected to a wall plug 116. The mobile plug 110 has degrees of freedom in relation to the support 114, thus enabling it to be centered on the wall plug 116 and to be coupled to it.

The device described above therefore enables the display 4 to be moved from one cockpit 2 to the other, or to the maintenance area 6 if necessary. A management and control device for this movement device is provided in order to synchronize its various operations and movements. This management and control device may be installed, for example, in a room with a view into the space inside which the display 4 is being moved. When this display 4 is in place, opposite a cockpit 2 for example, the bridge crane 34 moves up to the height of the display 4. The positions where the display 4 can be located are all stored in memory and the bridge crane 34 positions itself thanks to its barcode reading system. The display 4 is supplied with electricity via the wall plug 116 associated with the cockpit 2 opposite which it is located; the plug 110 is in its connected position.

The dolly 36 is prepositioned on the bridge crane 34 in order to be on the right side of the display 4 and its first interface device 32. This dolly 36 is supplied with electrical energy and with pneumatic energy. The electrical energy supply to the bridge crane occurs via conductors installed along rails 40 and contact slippers (not shown). Likewise, the bridge crane 34 is equipped with conductors arranged along its entire length and the dolly 36 is also equipped with contact slippers (not shown). The compressed air supply occurs along a rail 40 by a first distribution line 118 in order to supply the bridge crane 34 and by a second distribution line 120 along the bridge crane 34 in order to supply the dolly 36. On the dolly 36 itself, the second distribution line 120 arrives on the second interface device 38 and is connected to the connection plate 94 via a conveyor chain 122 (FIG. 7).

The dolly 36 then approaches the display 4 in the direction indicated by the arrow 44 in FIGS. 5 through 7. During this approach, the first roller 58 is in the raised position. It is only lowered once it has passed the sleeve 46 of the first interface device 32 associated with the tripod 26 attached to the display 4. The dolly 36 then advances in the direction indicated by the arrow 44 until the first roller 58 reaches the bottom of the V of the V-shaped part 48. During this operation, the blocking jacks 92 are placed in the open air and the engine 82 is not supplied with energy, such that the lower table 68 of the second interface device 38 has three degrees of freedom, two in translation in a horizontal plane and another in rotation around a vertical axis.

When the first roller 58 enters the V-shaped part, the second roller 60 slides between the alignment walls 50. This enables perfect positioning of the lower table 68 of the second interface device 38 in relation to the first interface device 32. When the first roller 58 bumps up against the V-shaped part 48, it is ensured that the bolt 54 is located opposite the sleeve 46. The jack 56 is actuated in order to bring the end of the bolt 54 inside the sleeve 46, thus ensuring the mechanical coupling of the dolly 36 of the bridge crane 34 to the display 4. Once this coupling is completed, the blocking jacks 92 are supplied with compressed air in order to prevent any translatory movement of the lower table 68.

The electrical and pneumatic connection between the dolly 36 and the display 4 is made after the mechanical coupling by acting upon the connection jack 95. The plate 94 and the connections that it carries then move towards the corresponding counterplate and the connection is made. The display 4 is then electrically connected by the wall plug 116 associated with the cockpit 2 and by the dolly 36. The display is also pneumatically connected, but solely by the dolly 36.

While the display 4 is being electrically connected to the wall plug 116 and to the dolly 36, a test is performed in order to monitor the accurate connection of the power plugs on the side of the dolly 36. The goal of this test is to verify that the current phases of the new connection in fact correspond to the initially expected and planned arrangement. This is to prevent a situation wherein an intervention is made on the electrical energy supply network and wherein the current phases are involuntarily changed by reversing two supply wires. This test prevents damage to the electrical equipment loaded onto the platform 18 and connected to the display 4.

If the test proves conclusive, switching means (not shown) switch the electrical energy supply of the display 4 from the wall plug 116 to the dolly 36. If the test is negative, the movement device is stopped and the anomaly is indicated on a control screen of the management and control device.

Once the switch is made, the plug 110 is removed from the wall plug 116 by actuating the hydraulic jack 112. Next, the display 4 is freed from its stops 8 by acting upon the securing jacks 108 in order to raise the corresponding securing arms 106. The platform 18 and the display 4 can then be suspended. The supply of compressed air to the air cushions from the dolly 36 is ordered. The assembly is raised by a few millimeters. The two interface devices (32 and 38) are given enough play to absorb these few millimeters and, thereafter, to absorb small variations in altitude of the display 4 while it is being moved.

The dolly 36 and the bridge crane 34 move to bring the display 4 to its destination. The movements of the dolly 36 in relation to the bridge crane 34 and the movements of the bridge crane 34 in relation to the rails 40 make it possible to move the display throughout the building. Thanks to the ring gear 76 and the engine 82, it is also possible to turn the display 4 at any angle. In the case of the figure shown in the drawing, when the display 4 moves from a cockpit 2 towards the maintenance area 6, or vice versa, a 180° pivot is made.

Upon its arrival opposite another cockpit 2 or on the maintenance area 6, the display 4 is guided at the end of its travel path by the guide rails 10 located on the ground. In fact, despite the suspension of the display 4 by the air cushions, the display 4, due to its considerable weight and friction with the ground—which is small, but does exist—is not always perfectly aligned with the dolly 36 while it is being moved. The guide rails 10 then allow the display 4 to be properly repositioned proceeding from the ground of the building.

At the end of its travel path, the display 4 comes to a stop against the stops 8 provided for this purpose. Centering can then be performed, as indicated above, by providing a guide on one of the stops 8. The stops 8 are detected by the sensors 104 at the end of the travel path. The display 4 has then arrived at its destination. In order to prevent any movement along a horizontal plane, securing is performed by actuating the securing jacks 108. The compressed air supply to the air cushions 24 is cut off and the display 4 comes to rest on the ground. Given the weight of the assembly, this securing is optional.

The hydraulic jack 112 is actuated in order to bring forward the plug 110 towards the wall plug 116, opposite which it remains until the two plugs (110 and 116) are connected. At this moment, the display 4 is again connected to a wall plug 116 and to a dolly 36. The test to determine that the phases on the wall plug 116 have been properly connected is then performed in the same way that the proper connection was tested for the connection to the dolly 36. If the connections are good, the power supply of the display is switched.

Here, a number of options are possible. One may wish to disconnect the dolly 36 from the display 4 in order to be sure that there are no interferences or in order to move the dolly 36 and its bridge crane 34. In this case, the disconnection is made by performing the connection operations in reverse direction and order. If a single display 4 is connected to the bridge crane 34, the dolly 36 preferably remains at the level of the display 4 if no maintenance operation is scheduled. Therefore, the dolly 36 is ready to move the display 4 again without delay once the order to move it is received. Conversely, if several displays 4 are connected to a bridge crane 34, the dolly 36 then preferably returns to a predefined rest position in order to be available for the displays once movement of them is desired.

The movement device described above enables movement of a very heavy weight (the display described and shown in the drawing weighs several tons) without covering the ground. Only a few guide rails are present near the spots where the weight is to rest. It should be noted that these guide rails are optional, in particular if at least one stop is equipped with centering means. The described embodiment is advantageous because it enables high-precision movement. Moreover, the adopted solution eliminates the need for electrical cables that move along with the bridge crane and its dolly. This device can be used in a wide variety of ways. In the described application, it results in only a single display being required for several cockpits. However, it is also possible to manage several displays with the described device. This would involve either identical displays or different displays (due to their size or functionalities).

The present invention is not limited to the embodiment described above, which is provided by way of non-limiting example. It also encompasses all embodiment variations within the grasp of the expert in the context of the claims that appear below.

Hence, for example, the suspension means need not be air cushions. Magnetic suspension could be used.

Providing aerial guide means makes it possible to free up the ground surface of the building in order to make it easier of access and to avoid disturbing any traffic that may occur. However, a tractor vehicle that pulls and/or pushes the load in order to move it from one spot to another could also be used.

The device according to the invention may have other applications for a flight simulator display apart from the one described above.

Other mechanical connection and coupling devices may be designed for a moving device according to the present invention. The described embodiments are preferred embodiments provided by way of non-limiting examples.

Obviously, numerous modifications and variations of the present invention are possible in light of the above teachings. It is therefore to be understood that within the scope of the appended claims, the present invention may be practiced otherwise than as specifically described herein.

The invention claimed is:

1. A device for moving a machine between plural workstations, comprising:
   means for placing the machine in suspension;
   a guide;
   means for supplying the guide with electrical energy;
   means for providing mechanical linkage between the machine and the guide;
   first connection means for electrically connecting the machine to the guide;
   second connection means for electrically connecting the machine to each workstation;
   switching means for changing an electrical energy supply source of the machine when the machine is connected to both a workstation and to the guide; and
   management and control means for moving the machine and for supplying electrical energy to the machine.

2. A device for moving a machine according to claim 1, wherein the means for placing the machine in suspension includes air cushions.

3. A device for moving a machine according to claim 2, wherein the air cushions are supplied with compressed air by the guide.

4. A device for moving a machine according to claim 1, wherein the guide includes an aerial guide and includes a dolly mounted on a bridge crane.

5. A device for moving a machine according to claim 4, wherein the bridge crane is equipped with marks placed on the bridge crane at regular intervals, and wherein the dolly includes a reader that cooperates with the marks to read a position of the dolly on the bridge crane.

6. A device for moving a machine according to claim 4, wherein the bridge crane is mounted to slide along two roughly parallel rails, and wherein each rail is equipped with marks placed on each rail at intervals and wherein the bridge crane includes a reader opposite each rail, with each reader cooperating with the corresponding marks to read a position of the bridge crane in relation to the corresponding rail.

7. A device for moving a machine according to one of claim 5, wherein the marks include barcodes.

8. A device for moving a machine according to one of claim 4, wherein the bridge crane is supplied with electrical energy by a system including a live conductor that extends longitudinally in relation to movement of the bridge crane and a contact slipper that is integral to the bridge crane and in permanent contact with the live conductor.

9. A device for moving a machine according to claim 4, wherein the connection means includes a first connector installed on the machine and a connector configured to cooperate with the first connector and that is installed on the dolly mounted on the bridge crane, wherein the first connector is in a fixed position on the machine, and wherein the second connector is in a mobile position on the dolly between a first position at which the second connector is connected to the first connector when both connectors are facing each other and a second position at which the second connector is at a distance from the first connector, a direction of movement of the second connector being roughly perpendicular to a junction plane of the first and second connectors.

10. A device for moving a machine according to claim 1, wherein the means for providing mechanical linkage includes a vertical linkage bolt and a housing whose shape corresponds to a shape of the linkage bolt to accommodate the linkage bolt, and wherein the vertical linkage bolt is placed on the guide and the housing is placed on the machine, or vice versa, and the device further comprising means for performing a relative movement of the linkage bolt in relation to the housing, in a vertical direction, for enabling the linkage bolt to enter or exit the housing when the linkage bolt is vertically aligned with the housing.

11. A device for moving a machine according to claim 10, wherein the means for providing mechanical linkage further includes positioning means with a positioning roller and a V-shaped housing to accommodate the positioning roller, and wherein the positioning roller is integral to the guide and the V-shaped housing is integral to the machine, or vice versa.

12. A device for moving a machine according to claim 11, wherein the positioning roller is mobile between a raised position and a lowered position, and wherein the positioning roller is configured to cooperate with the V-shaped housing to position the machine in relation to the guide.

13. A device for moving a machine according to claim 11, wherein the means for providing mechanical linkage further includes an alignment mechanism that includes converging guide walls and an alignment roller that moves between the guide walls, wherein a minimal distance between the guide walls corresponds roughly to a diameter of the alignment roller, wherein the alignment roller is integral to the guide and the guide walls are integral to the machine, and wherein the linkage bolt, the positioning roller in a lowered position, and the alignment roller are aligned and at roughly the same height.

14. A device for moving a machine according to claim 1, wherein the second connection means includes a first connector installed on the machine and a second, fixed connector that cooperates with the first connector and is installed on a vertical wall of the workstation, and wherein the first connector is mobile on the machine between a first advanced position, at which the first connector is connected to the second connector when the first and second connectors are opposite each other, and a second withdrawn position, at which the first connector is at a distance from the second connector, movement direction of the first connector being roughly horizontal and perpendicular to a junction plane of the first and second connectors.

15. A device for moving a machine according to one of claim 1, wherein the switching means includes comparison means for verifying, prior to switching, that a line connection of electrical current phases of a future supply source corresponds to a line connection of the electrical current phases of a present supply.

16. A device for moving a machine according to claim 1, wherein each workstation is equipped with two stops that cooperate with counterstops installed on the machine, and wherein the machine includes securing means for securing the machine onto at least one of the stops.

17. A device for moving a machine between workstations, comprising:
   air cushions configured to put the machine in suspension;
   a guide coupled to said machine so that said machine is movable along said guide;
   an energy supplier configured to supply electrical energy to the guide;
   a first connector configured to electrically connect the machine to the guide;
   a second connector configured to electrically connect the machine to each workstation; and
   a switch configured to change an electrical energy supply source of the machine when the machine is connected to both a workstation and to the guide.

18. The device for moving a machine according to claim 17, further comprising:
   a controller configured to move the machine and supply electrical energy to the machine.

19. A device for moving a machine between plural workstations, comprising:
   air cushions configured to place the machine in suspension;
   a guide;
   an energy supplier configured to supply electrical energy to the guide;
   linkage configured to mechanically link the machine and the guide;
   a first connector configured to electrically connect the machine to the guide;
   a second connector configured to electrically connect the machine to each workstation;
   a switch configured to change an electrical energy supply source of the machine when the machine is connected to both a workstation and to the guide; and
   a controller configured to move the machine and to supply electrical energy to the machine.

* * * * *